(12) United States Patent
Yoshida et al.

(10) Patent No.: US 9,028,981 B2
(45) Date of Patent: May 12, 2015

(54) METAL MAGNET AND MOTOR USING THE SAME

(75) Inventors: Kenichi Yoshida, Tokyo (JP); Jun Hagiwara, Tokyo (JP)

(73) Assignee: TDK Corporation, Tokyo (JP)

( * ) Notice: Subject to any disclaimer, the term of this patent is extended or adjusted under 35 U.S.C. 154(b) by 253 days.

(21) Appl. No.: 12/814,029

(22) Filed: Jun. 11, 2010

(65) Prior Publication Data

US 2010/0330361 A1    Dec. 30, 2010

(30) Foreign Application Priority Data

Jun. 29, 2009    (JP) ................. 2009-153723

(51) Int. Cl.
| | |
|---|---|
| *B32B 15/00* | (2006.01) |
| *H02K 1/27* | (2006.01) |
| *B32B 15/01* | (2006.01) |
| *C22C 38/00* | (2006.01) |
| *C25D 7/00* | (2006.01) |
| *H01F 7/02* | (2006.01) |
| *H01F 41/02* | (2006.01) |
| *H01F 1/057* | (2006.01) |

(52) U.S. Cl.
CPC .......... *H02K 1/2786* (2013.01); *Y10T 428/265* (2015.01); *B32B 15/015* (2013.01); *C22C 38/002* (2013.01); *C22C 38/005* (2013.01); *C25D 7/001* (2013.01); *H01F 1/0577* (2013.01); *H01F 7/0221* (2013.01); *H01F 41/026* (2013.01); *H02K 1/27* (2013.01)

(58) Field of Classification Search
None
See application file for complete search history.

(56) References Cited

U.S. PATENT DOCUMENTS

| | | | |
|---|---|---|---|
| 2004/0188267 A1* | 9/2004 | Sakamoto et al. | 205/181 |
| 2006/0141281 A1* | 6/2006 | Nakayama et al. | 428/627 |
| 2008/0053573 A1* | 3/2008 | Sakamoto et al. | 148/301 |
| 2008/0118747 A1* | 5/2008 | Komatsu et al. | 428/336 |

FOREIGN PATENT DOCUMENTS

| | | |
|---|---|---|
| JP | A-9-7810 | 1/1997 |
| JP | A-2006-179800 | 7/2006 |
| WO | WO 2004/079055 A1 | 9/2004 |

\* cited by examiner

*Primary Examiner* — Holly Rickman
*Assistant Examiner* — Lisa Chau
(74) *Attorney, Agent, or Firm* — Oliff PLC (57) ABSTRACT

A metal magnet 10 including a magnet body 12 and a coating layer 14 over the magnet body 12, in which the coating layer 14 has a Martens hardness of 2000 N/mm$^2$ or more and an elastic resilience of 25% or less, and a motor including the metal magnet 10.

13 Claims, 3 Drawing Sheets

METAL MAGNET AND MOTOR USING THE SAME

BACKGROUND OF THE INVENTION

1. Field of the Invention

The present invention relates to a metal magnet and a motor using the same.

2. Related Background Art

Metal magnets, such as a rare earth magnet, may face problems such as corrosion or abrasion, caused by the environment where they are used. Because of this, the metal magnets are provided with a coating layer to protect the surface. As the coating layers, various materials, such as a plated film or a resin film, can be used according to the use of the metal magnets and required characteristics.

For example, Japanese Unexamined Patent Application Publication No. H 9-7810 (hereinafter, referred to as Patent Document 1) proposes coating the surface of a magnet body by laminating a metal-plated layer having a low Vickers hardness and a metal coating layer having a higher Vickers hardness than the metal-plated layer in order to improve the corrosion resistance of an R—Fe—B based rare earth magnet (where R is a at least one kind of rare earth element that contains yttrium).

SUMMARY OF THE INVENTION

Metal magnets are used for a variety of applications, and require a variety of characteristics according to the applications. For example, when a metal magnet is used in a motor or the like, impact is repeatedly applied to a predetermined portion of the metal magnet in response to rotation or reciprocation. Therefore, the surface of such metal magnet is required to have sufficient scratch resistance so that it is not easily worn by repeated impact.

However, the inventors have found, through examination, that it is difficult to provide a coating layer, which has sufficient scratch resistance against repeated impact, merely by adjusting the Vickers hardness of the coating layer as in Patent Document 1.

Therefore, one object of the invention is to provide a metal magnet that has sufficient scratch resistance against repeated impact. In addition, another object of the invention is to provide a motor that has such a metal magnet so that it can maintain high output for a longer time than conventional motors.

The inventors have performed a variety of examinations in order to obtain the foregoing objects, and came to accomplish the present invention by finding that, in the case of repeated impact, it is effective to specify elastic resilience, that is, the ratio of the work load of elastic deformation as well as specifying Martens hardness as an index that expresses hardness rather than conventional Vickers hardness.

That is, the present invention provides a metal magnet including a magnet body and a coating layer over the magnet body, in which the coating layer has a Martens hardness (HM) of 2000 N/mm² or more and an elastic resilience ($\eta_{IT}$) of 25% or less.

The metal magnet according to the present invention includes the coating layer that has a Martens hardness of a predetermined value or more and an elastic resilience of a predetermined value or less. That is, the coating layer of the metal magnet according to the present invention can reduce the amount of deformation (a total of plastic deformation and elastic deformation) when external force is applied since its Martens hardness is a predetermined value or more. In addition, the coating layer has a small amount of resilience after having been deformed by external force since its elastic resilience is a predetermined value or less. Due to the small amount of resilience against elastic deformation, even if impact is repeatedly applied, it can be considered that there is a characteristic that the portion to which the impact is applied is not easily brittle. As such, the metal magnet according to the present invention is considered to have excellent scratch resistance, especially to repeated impact, since the amount of deformation of the coating layer is slight when impact is applied and there is a small amount of resilience after having been impacted. Therefore, the metal magnet according to a preferred embodiment of the invention is ideal for use as a magnet for a motor, which is readily susceptible to the repeated impact.

In the metal magnet according to a preferred embodiment of the invention, it is preferred that the elastic resilience of the coating layer be 5% or more. Due to this property, for example, when disturbing particles, such as sand dust, collide against the coating layer of the metal magnet, it is possible to prevent the disturbing particles from being urged into or staying in the coating layer, thereby sufficiently preventing the coating layer from being destroyed. In other words, it is possible to ensure excellent scratch resistance for the metal magnet by setting the elastic resilience of the coating layer to the range from 5 to 25%.

In the metal magnet according to a preferred embodiment of the invention, the thickness of the coating layer can be from 1 to 50 μm. This can sufficiently prevent the magnet body from being exposed so that it does not corrode while reducing manufacturing costs.

In addition, the present invention also provides a motor including a metal magnet as described above. The motor according to the present invention having the metal magnet as described above can operate with high output for a long time even if it is used in a hostile environment, such as a dusty environment.

According to the present invention, it is possible to provide the metal magnet that has sufficient scratch resistance against repeated impact. In addition, it is possible to provide the motor, which can maintain high output for a longer time period when compared to the conventional art, by providing such a metal magnet.

DESCRIPTION OF THE PREFERRED EMBODIMENTS

The preferred embodiments of the present invention will now be described more fully with reference to the accompanying drawings. In the drawings, the same or equivalent elements are denoted by the same reference numerals and repeated description will be omitted.

Figure 1:
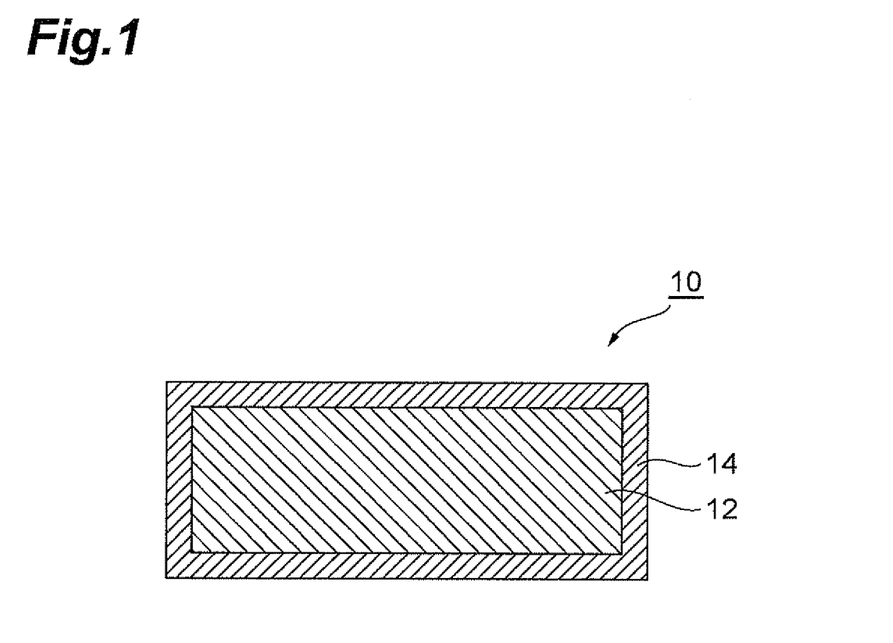
FIG. 1 is a schematic cross-sectional view showing a metal magnet according to a preferred embodiment of the invention.

FIG. 1 is a schematic cross-sectional view showing a metal magnet according to a preferred embodiment of the invention. The metal magnet 10 includes a magnet body 12 and a coating layer 14 covering the entire surface of the magnet body 12.

Preferably, from the viewpoint of high magnetic characteristics, the metal magnet 10 is a rare earth magnet that includes a rare earth sintered magnet as the magnet body 12.

If the magnet body 12 is a rare earth sintered magnet, the rare earth element of the magnet can be scandium (Sc), yttrium (Y), or a lanthanoid element, which belongs to the Group III elements of the long form of periodic table. In addition, examples of the lanthanoid elements include lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), and the like.

The material constituting the magnet body 12 can be, by way of example, a combination of the rare earth element and a transition element other than the rare earth element. It is preferable that the rare earth element be at least one element selected from the group consisting of Nd, Sm, Dy, Pr, Ho, and Tb. One or more elements selected from the group consisting of La, Ce, Gd, Er, Eu, Tm, Yb, and Y can be preferably contained in addition to the rare earth element.

The transition element, other than the rare earth element, can preferably be one or more elements selected from the group consisting of iron (Fe), cobalt (Co), titanium (Ti), vanadium (V), chromium (Cr), manganese (Mn), nickel (Ni), copper (Cu), zirconium (Zr), niobium (Nb), molybdenum (Mo), hafnium (Hf), tantalum (Ta), tungsten (W). Fe and/or Co are more preferable.

In more detail, the material constituting the magnet body 12 is preferably R—Fe—B based (R is at least one kind of rare earth element including Y). Here, R preferably contains Nd. Use of the magnet body 12 can further increase the effect of improving corrosion resistance due to the formation of the coating layer 14 while ensuring excellent magnet characteristics.

The type of the coating layer 14 is not specifically restricted as long as it has a predetermined range of Martens hardness and elastic resilience. Examples of the coating layer 14 may include a plated film, a resin film, a resin layer, which contains resin formed by coating or deposition polymerization, as a major component, a metal layer, which contains metal formed by plating or evaporation, an inorganic layer, which contains an inorganic compound formed by plating or evaporation as a major component, or the like. Of these layers, the metal layer formed by plating or evaporation is preferable, and the metal layer formed by plating is more preferable. Examples of the plated film may include a Ni-plated film, a layer, which contains Ni—B, Ni—P, Cu, Zn, Cr, Sn, Ag, Au, or Al as a major component, or a metal-plated layer made of an alloy thereof. The plated film is formed by, for example, an electroplating or electroless plating method.

In the fabrication of the coating layer 14, it is possible to increase Martens hardness by forming the coating layer 14 from an alloy. Meanwhile, it is possible to reduce the elastic resilience of the coating layer 14 by forming a plated film using a plating bath, which contains 50 to 250 g/L of sodium chloride and/or potassium chloride.

The Martens hardness and elastic resilience of the coating layer 14 can be measured using, for example, a nanoindentation system (Fischer Scope HM2000™) available from Fischer Technologies Inc.

Figure 2:
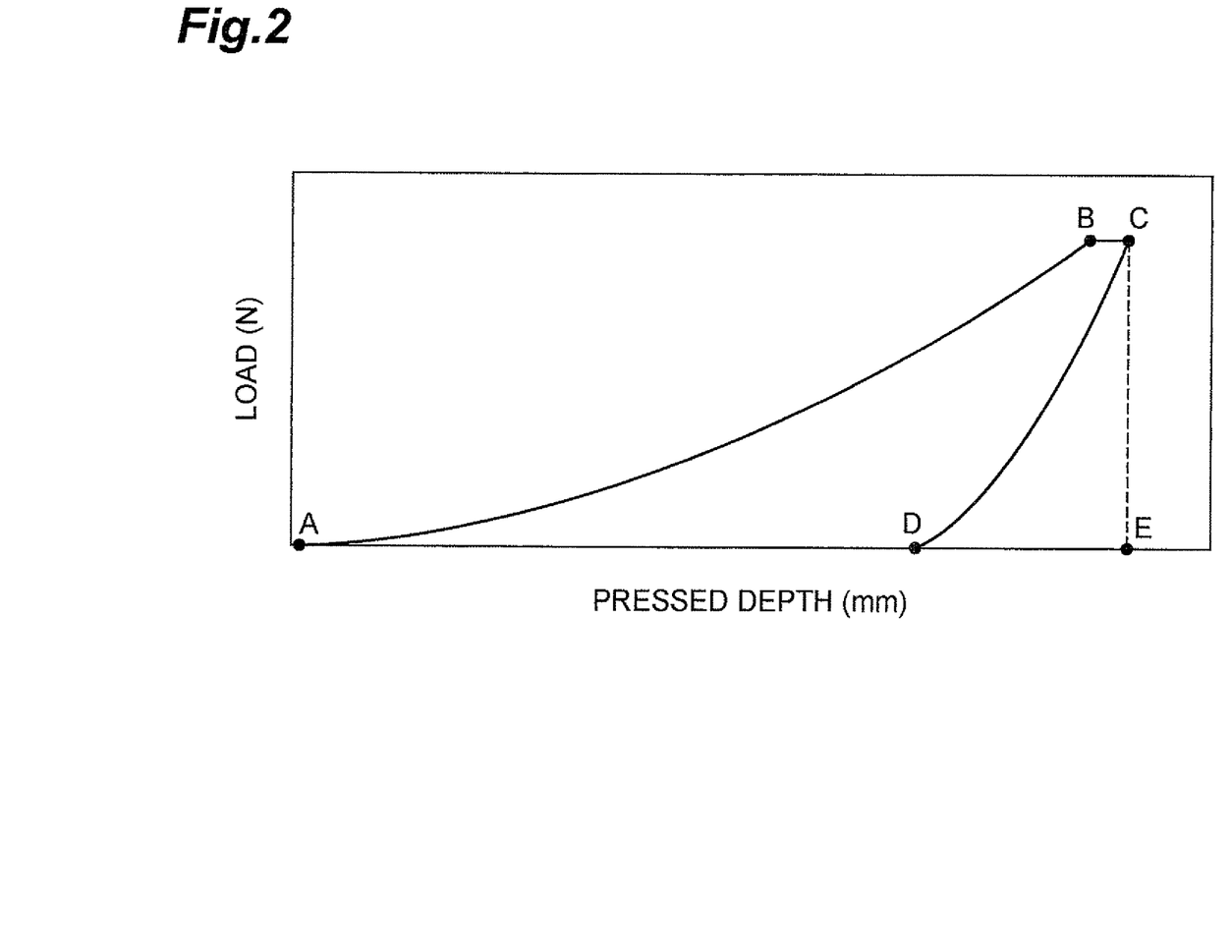
FIG. 2 is a diagram showing the relationship of the pressed depth of a coating layer of the metal magnet to the load according to a preferred embodiment of the invention.

FIG. 2 is a graph showing the relationship of the pressed depth of the coating layer 14 of the metal magnet 10 to the load according to a preferred embodiment of the invention, measured using the above-described measuring device. Continuing to refer to FIG. 2, a description will be given of a method for measuring the Martens hardness and elastic resilience of the coating layer 14. First, a Vickers indenter is pushed onto the coating layer 14 of the metal magnet 10, shown in FIG. 1, under the minimum load $F_{min}$ (point A in FIG. 2). In addition, the Vickers indenter can be pushed onto the cross-sectional surface of the coating layer 14 of the metal magnet 10, which is obtained by abrasion. Afterwards, the load is increased up to the maximum load $F_{max}$ across a predetermined time period $t_1$ until it reaches point B of FIG. 2. The maximum load is then maintained for a predetermined time $t_2$ until it reaches point C of FIG. 2. Next, the load is reduced from the maximum load to the minimum load $F_{min}$ for a predetermined time $t_3$ until it reaches point D of FIG. 2. It is possible to measure the Martens hardness (HM) of the coating layer 14 from the pressed depth h at the point B of FIG. 2, that is, the pressed depth under the maximum load, according to the following formula.

$$HM = (\text{load } F[N])/(\text{surface area [mm}^2\text{] of indenter produced from pressed depth}) = F_{max}/26.43\,h^2$$

Here, "26.43 $h^2$" is the surface area [mm$^2$] measured from the pressed depth h [mm], in the case of the shape of the Vickers indenter.

Meanwhile, referring to the graph of FIG. 2, a total work load "Wt", required to form an imprint into the coating layer 14, is expressed by the area surrounded by the points A-B-C-E-A. Meanwhile, the work load "We" of the elastic deformation of a total of the work is expressed by the area surrounded by the points D-C-E-D. In addition, the elastic resilience [%] is measured from the formula: We/Wt×100.

As for the measurement as shown in FIG. 2, $t_1$ and $t_3$ are set, for example, to 10 seconds, whereas $t_2$ is set, for example, to 0.1 second. In addition, $F_{max}$ and $F_{min}$ are set, for example, to 25 mN and 0.1 mN, respectively. In addition, it is preferred that $t_1$, $t_2$, $t_3$, $F_{max}$, and $F_{min}$ be properly adjusted depending on the thickness of the coating layer 14 in order to exclude the influence of the underlying layer or the magnet body 12 and accurately measure the properties of the coating layer 14 itself.

The upper limit of the Martens hardness of the coating layer 14 is preferably 6000 N/mm$^2$, and more preferably, 5000 N/mm$^2$. Treatment such as alloying treatment is required to produce the coating layer 14 that has a Martens hardness exceeding 5000 N/mm$^2$. This, however, causes the manufacturing process to be complicated, thereby tending to lower productivity. In addition, even if the Martens hardness is raised higher than 6000 N/mm$^2$, it does not tend to produce further improvement in the characteristics.

The lower limit of the Martens hardness of the coating layer 14 is preferably 2500 N/mm$^2$. As a result of having the Martens hardness of the coating layer 14 of 2500 N/mm$^2$ or more, it is possible to ensure that the metal magnet 10 reduces the amount of plastic deformation due to the collision of disturbing particles such as sand dust and has more excellent scratch resistance.

The upper limit of the elastic resilience of the coating layer 14 is 25% and preferably 24% from the viewpoint of ensuring that the coating layer 14 has more excellent scratch resistance. Meanwhile, the lower limit of the elastic resilience of the coating layer 14 is preferably 5% and more preferably 10%. If the elastic resilience is lower than 5%, when the disturbing particles collide against and are urged into the coating layer 14, the number of disturbing particles staying on the coating layer 14 without being detached from the coating layer 14 becomes great. Thus, the coating layer 14 is more likely to be destroyed by the disturbing particles. However, if the elastic resilience of the coating layer 14 is 10% or more, the disturbing particles, which collide against and are urged into the coating layer 14, can be easily detached from the coating layer 14 by elastic resilience, thereby sufficiently preventing the coating layer 14 from being destroyed.

The thickness of the coating layer 14 is preferably from 1 to 50 µm and more preferably from 2 to 40 µm. If the thickness of the coating layer 14 is less than 1 µm, the surface of the magnet body 12 can be easily exposed to the outside, and it tends to be difficult to ensure initial corrosion resistance. If the thickness of the coating layer 14 exceeds 50 µm, the cost of forming the coating tends to increase. Due to the thickness of the coating layer 14 set from 2 to 40 µm, it is possible to ensure that the metal magnet 10 has excellent initial corrosion resistance and dimension precision even if the surface of the magnet body 12 has unevenness.

The metal magnet 10 according to this embodiment has excellent scratch resistance against repeated impact since it has the Martens hardness, which is specified as an index that indicates hardness, and the elastic resilience, which is specified as a ratio of the work of elastic deformation.

The metal magnet 10 can also have an underlying layer between the magnet body 12 and the coating layer 14. The underlying layer can have a composition the same as that of the coating layer 14. For example, the underlying layer can be formed of a plated film, a resin film, a resin layer, which contains resin formed by coating or deposition polymerization as a major component, a metal layer, which contains metal formed by plating or evaporation, an inorganic layer, which contains an inorganic compound formed by plating or evaporation as a major component, or the like. Another coating layer different from the coating layer 14 can be formed over the coating layer 14. This coating layer can be made of a material different from or the same as that of the coating layer 14. In addition, the coating layer 14 can be formed of multiple layers.

Next, a description will be given of a method for manufacturing the metal magnet 10 according to this embodiment. In the case where the magnet body 12 is made of a rare earth sintered magnet, the magnet body 12 can be fabricated by the following sequence. First, raw material metals corresponding to individual components of the rare earth sintered magnet are prepared and a raw material alloy is manufactured by performing strip casting or the like using these metals. Examples of the raw material metals include rare earth metals, rare earth alloys, pure iron, ferro boron, alloys thereof, or the like. The raw material alloys, from which the composition of the intended rare earth sintered magnet is produced, are manufactured using them. In addition, a plurality of alloys having different compositions can be used for the raw material alloy.

Next, raw material alloy powder is prepared by pulverizing the raw material alloy. The process of pulverizing the raw material alloy is preferably performed by two processes, i.e., a rough pulverization process and a fine pulverization process. The rough pulverization process can be performed, for example, using a stamp mill, a jaw crusher, a brown mill, and the like in an inert gas atmosphere. In addition, hydrogen storage pulverization can be performed by storing hydrogen into a raw material alloy, followed by pulverization. In the rough pulverization process, the raw material alloy is pulverized until its particle size becomes several hundreds of micrometers (µm).

Next, in the fine pulverization process, the pulverized product, obtained in the rough pulverization process, is finely pulverized until its mean particle diameter becomes 3 to 5 µm. The fine pulverization can be performed, for example, using a jet mill. The pulverization of the raw material alloy is not necessarily performed by the two steps of the rough pulverization and the fine pulverization. Rather, the fine pulverization can be performed from the initial stage. In addition, when multiple types of raw material alloys are prepared, the raw material alloys can be separately pulverized and then be mixed together.

Subsequently, a compact is produced by performing pressing in a magnetic field on the raw material powder obtained as above. More specifically, the pressing in a magnetic field includes: loading the raw material powder into a mold, which is arranged inside an electromagnet, and pressing the raw material powder while orienting the crystal axis of the raw material powder by applying a magnetic field to the raw material powder using the electromagnet. The pressing in the magnetic field can be performed, for example, under a pressure of about from 0.7 to 1.5 ton/cm$^2$ (about 68.65 to 147.1 MPa) inside the magnetic field having a strength from 12.0 to 17.0 kOe (about 955 to 1383 kA/m).

After the pressing in the magnetic field, the compact is fired in a vacuum or inert gas atmosphere, thereby producing a sintered body. The firing can be performed, for example, at a temperature from 1000 to 1100° C. for 1 to 5 hours although it is preferable that the firing temperature be set appropriately according to conditions such as composition, pulverization method, and grain size.

In addition, a rare earth sintered magnet (the magnet body 12) is produced by aging the sintered body when necessary. In the sintered magnet, which is produced by the aging, HcJ tends to increase. The aging can be performed, for example, in two steps. Preferably, the aging can be performed in two temperature conditions: one temperature of about 800° C. and the other temperature of about 600° C. When the aging is performed under these conditions, particularly excellent HcJ tends to be accomplished. If the aging is performed in one step, the aging temperature is preferably about 600° C.

The coating layer 14 is formed over the surface of the magnet body 12, which is produced as above. In the case where the coating layer 14 is formed as a plated film, the coating layer 14 is formed over the magnet body 12, for example, by the following sequence.

First, in order to facilitate forming of the plated film, pretreatment such as alkali degreasing, acid pickling, smut removal, or the like is performed on the magnet body 12. The pretreated magnet body 12 is immersed into a plating bath, which contains a nickel source, a conductive salt, and a pH stabilizer or the like, and then electroplating is performed for a predetermined time period. This, as a result, forms the coating layer 14 having an intended thickness over the magnet body 12. In this manner, the metal magnet 10, which includes the magnet body 12 and the coating layer 14 covering the entire surface of the magnet body 12, can be produced.

The method for manufacturing the metal magnet 10 is not limited to the above-described method. Rather, the coating layer 14 can be formed by an electroless plating method or a resin film-forming method or the like, which applies a resin component over the metal magnet. The coating layer is not necessarily formed over the entire surface of the magnet body 12. Rather, the coating layer can be formed over only a portion, in which scratch resistance is required according to the shape of the magnet body 12 or the use of the metal magnet 10.

Figure 3:
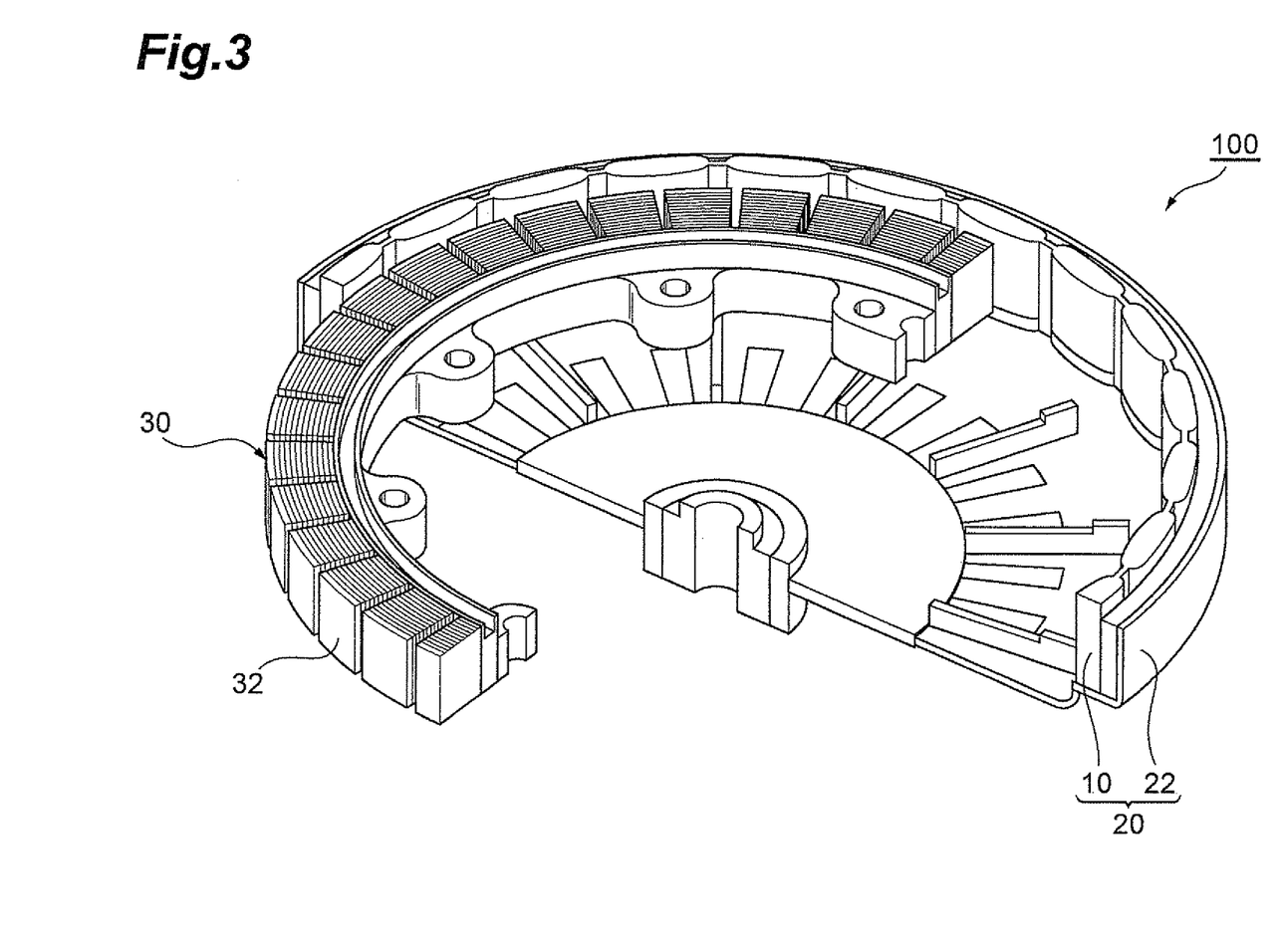
FIG. 3 is an illustrative view showing the inner structure of a motor according to a preferred embodiment of the invention.

Next, a description will be given of a motor according to a preferred embodiment of the invention.

FIG. 3 is an illustrative view showing the inner structure of a motor according to a preferred embodiment of the invention. The motor 100 of this embodiment is a permanent magnet synchronous motor (SPM motor), and includes a cylindrical rotor 20 and a stator 30 arranged inside the rotor 20. The rotor 20 includes a cylindrical core 22 and a plurality of metal magnets 10, which are arranged along the inner circumference of the core 22 such that N and S poles alternate with each other. The stator 30 has a plurality of coils 32 arranged along the outer circumference thereof. The coils 32 are arranged opposite the metal magnets 10.

The SPM motor 100 has the metal magnets 10 according to the above-described embodiment in the rotor 20. Therefore, it is possible to ensure that the metal magnets 10 and the coils 32 have a sufficiently small gap between them, torque-current characteristics have excellent linearity, and controllability is excellent. In addition, even if sand dust or the like is urged into the gap between the rotor 20 and the stator 30, the metal magnets 10 are not easily damaged since they have excellent scratch resistance. This is due to the coating layer 14 of the metal magnets 10, which has excellent resistance to repeated damage. Therefore, even if the magnet body 12 is made of, for example, a rare earth magnet that may easily corrode, it is possible to sufficiently prevent magnetic characteristics from deteriorating over time due to corrosion of the magnet body 12, and the SPM motor 100 can maintain high output for a longer time than conventional motors.

While the present invention has been described with respect to the preferred embodiments thereof, the present invention is not limited thereto. For example, the metal magnet of the invention can be a metal magnet other than the rare earth magnet; i.e., the metal magnet of the invention may not contain a rare earth element.

In addition, the motor of the invention is required only to have a structure having a possibility that the metal magnet may come into contact with disturbing particles or a structure having a possibility that the metal magnet may come into direct contact with another motor member. Examples of the motor having the former structure may include, in addition to the permanent magnet synchronous motor (SPM motor) as described above, a permanent magnet Direct Current (DC) motor, a linear synchronous motor, a voice coil motor, a vibration motor, and the like. In addition, examples of the latter motor may include an Interior Permanent Magnet (IPM) motor, i.e., a permanent magnet synchronous motor with a metal magnet inserted into the interior of the rotor.

The various motors described above, which have the metal magnet 10 according to the above-described embodiment, can sufficiently prevent the magnet body from corroding for a long time since a scratch such as a crack does not easily occur on the surface of the metal magnet even if the motor member expands due to centrifugal force or heat during the operation of the motor or sand dust is blown into the gap between the rotor and the stator. Therefore, the metal magnet 10 can maintain its own magnetic characteristics for a long time even if it is used in a hostile environment and can maintain high output for a longer time than conventional magnets.

EXAMPLES

The following Examples and Comparative Examples will provide a more detailed description of the present invention. However, these examples in no way limit the extent of the invention.

Example 1

Fabrication of Magnet Body

An ingot having a composition, which includes, by mass, 27.4% Nd, 3.0% Dy, 1.0% B, and 68.6% Fe, was prepared by powder sintering. The ingot was then pulverized by a stamp mill and a ball mill, thereby forming alloy powder having the above composition.

The obtained alloy powder was pressed in a magnetic field, thereby forming a compact. The compact was sintered to form a sintered body under certain conditions, i.e., by maintaining a temperature of 1100° C. for one hour. Aging was performed to the sintered body to form a rare earth sintered magnet under certain conditions, i.e., by maintaining a temperature of 600° C. for two hours in the Ar gas atmosphere. The resultant rare earth sintered magnet was processed into a size of 20×10×2 (mm) and chamfering was then performed on the magnet by barrel grinding, thereby forming a magnet body.

Next, pretreatment, which includes alkali degreasing, water washing, acid pickling in an nitric acid solution, water washing, smut removal by ultrasonic cleaning, and water washing, was performed on the magnet body.

A plating bath having a composition as shown in Table 1 below was prepared. The plating bath had a pH of 8.7 and a temperature of 40° C.

TABLE 1

| Chemical Component | Concentration |
| --- | --- |
| Copper pyrophosphate•trihydrate | 10 g/L |
| Potassium pyrophosphate | 200 g/L |
| Potassium chloride | 100 g/L |
| Sodium ethylenediaminetetraacetate | 20 g/L |

The magnet body, on which the pretreatment as described above was performed, was immersed into a plating bath as shown in Table 1 above and was then subjected to electroplating. The electroplating was performed at a current density of 0.2 A/dm$^2$ by a barrel plating method so that a Cu-plated film having a thickness of 10 μm was formed over the surface of the magnet body. In this manner, the Cu-plated film was formed over the surface of the magnet body to obtain a rare earth magnet having a coating layer made of the Cu-plated film. The resultant rare earth magnet was cleaned using pure water and dried, and was then used as an evaluation sample as follows.

<Evaluation of Hardness>

The relationship between the pressed depth of the coating layer of the rare earth magnet and the load was obtained and the Martens hardness (HM [N/mm$^2$]), elastic resilience ($\eta_{IT}$ [%]), and Young's modulus ($E_{IT}$ [GPa]) of the coating layer of the rare earth magnet were measured using a nanoindentation system (Fischer Scope HM2000™) available from Fischer Instruments Corporation. In addition, the Vickers hardness (Hv) of the coating layer of the rare earth magnet was measured using a Vickers hardness meter capable of measuring a minute value, which is commercially available. The measuring result is shown in Table 11 below. In addition, the Young's modulus ($E_{IT}$ [GPa]) is calculated by the following formula.

$$E_{IT} = \sqrt{\pi}/2 \times Tc / \sqrt{S} \times 10^{-3} = \sqrt{\pi}/2 \times Tc/4.950h \times 10^{-3} [GPa]$$

Here, Tc indicates the slope (N/mm) of the curve C-D shown in FIG. 2 at the point C, and S indicates a projection contact area (mm$^2$) of the portion pressed by an indenter under maximum load. "4.950 h" indicates the square root (mm) of the projection contact area measured from a pressed depth h (mm) in the case of the shape of the Vickers indenter.

In addition, measurement was performed by setting the depth of an imprint to be 0.8 μm or less (¹/₁₀ or less of the thickness of the coating layer) and preventing an influence from the base (magnet body) of the coating layer by setting $F_{max}$, $F_{min}$, $t_1$, $t_2$, and $t_3$ in the hardness evaluation as follows.

$F_{max}$=25 mN, $F_{min}$=0.1 mN $t_1$=10 seconds, $t_2$=0.1 seconds, $t_3$=10 seconds <Evaluation of Amount of Abrasion>

An outer rotor-type three-phase brushless permanent magnet direct current motor (hereinafter, referred to as a "DD" motor), which has 24 poles and 36 slots, was assembled using the rare earth magnets, which were manufactured as described above. The DD motor was prepared inside a dust fall test apparatus and a sand dust (dust fall) test was performed based upon JIS (JISC60068-2-68) (test type: test Lb). In the sand dust test, the DD motor was caused to continuously operate for a certain time (1 to 30 days) at a rotational speed of 1400 rpm by three-phase inverter sine-wave drive.

After the sand dust test, the DD motor was disassembled, and ten scratches were selected randomly from among the scratches on the surface of the coating layer of the rare earth magnet formed by the collision of sand dust. The surface shapes of the selected scratches were observed using a commercially-available laser microscope, and image information including height information was recorded. The depths of the scratches were obtained from the image information and the maximum value was set as the amount of abrasion. As the result of the observation on the scratches, evaluation was classified into "A," "B," "C," and "D." "A" indicates that the amount of abrasion of the coating layer of the rare earth magnet was less than 1 μm and no cracks were not formed on the scratched portion of the surface of the coating layer, "B" indicates that the amount of abrasion was 1 μm or more and cracks were not formed on the scratched portion of the surface of the coating layer, "C" indicates that cracks were formed on the scratched portion of the surface of the coating layer, and "D" indicates that the body (magnet body) was exposed. The result is shown in Table 12 below.

<Evaluation of Corrosion Resistance>

The rare earth magnet extracted by disassembling the DD motor after the above-described sand dust test was stored for 500 hours in a constant humidity-temperature chamber, which was maintained at a temperature of 85° C. and a relative humidity of 85 RH %. Then, changes in the exterior of the magnet before and after the storage were visually evaluated. As the references of the evaluation, "A" indicates that no exterior changes were found and "B" indicates that rust was found from the scratches. The result is shown in Table 12 below.

Example 2

A rare earth magnet was produced under the conditions equal to those of Example 1, except that a plating bath (pH: 4.5, temperature of 40° C.) having a composition of Table 2 below was used and a Ni-plated film was formed, in place of a Cu-plated film, over the surface of a magnet body as a coating layer. In addition, individual evaluations were performed on the rare earth magnet in the same manner as Example 1. The individual results are shown in Tables 11 and 12.

TABLE 2

| Chemical Component | Concentration |
| --- | --- |
| Nickel sulfamate | 180 g/L |
| Potassium chloride | 100 g/L |
| Boric acid | 35 g/L |

Example 3

A magnet body was manufactured in the same manner as in Example 1 and pretreatment was performed in the same manner as in Example 1. In addition, a first plating bath having the composition of Table 3 below was manufactured. In the first plating bath manufactured, pH was 4.5 and temperature was 50° C.

TABLE 3

| Chemical Component | Concentration |
| --- | --- |
| Nickel sulfate•hexahydrate | 270 g/L |
| Nickel chloride•hexahydrate | 50 g/L |
| Boric acid | 45 g/L |
| Acetaldehyde | 0.02 mL/L |
| Formaldehyde | 0.20 mL/L |

The magnet body, on which the pretreatment was performed, was immersed into the first plating bath of Table 3 and electroplating was performed. The electroplating was performed by a barrel plating method at a current density of 0.2 A/dm$^2$ so that a Ni-plated film (hereinafter, referred to as an "underlying layer") having a thickness of 2 μm was formed over the surface of the magnet body. In this manner, the rare earth magnet 1 having the underlying layer made of the Ni plate film over the surface of the magnet body was produced.

A plating bath used in Example 2 was prepared as a second plating bath. The rare earth magnet 1 cleaned by water was immersed into the second plating bath and electroplating was performed. The electroplating was performed at a current density of 0.2 A/dm$^2$ by a barrel plating method so that a Ni-plated film having a thickness of 8 μm was formed over the surface of the magnet body. In this manner, the rare earth magnet 2, which has the coating layer made of the Ni-plated film formed over the surface of the rare earth magnet 1, was produced. The rare earth magnet 2 is structured such that the underlying layer and the coating layer are laminated sequentially from the side of the magnet body. Individual evaluations were performed on the rare earth magnet 2 in the same manner as in Example 1. The results of the individual evaluations are shown in Tables 11 and 12 below.

Example 4

A rare earth magnet was produced under the conditions equal to those of Example 1, except that a plating bath (pH: 4.0, temperature of 50° C.) having a composition of Table 4 below was used and a Ni-plated film was formed, in place of a Cu plated-film, over the surface of a magnet body as a coating layer. In addition, individual evaluations were performed on the rare earth magnet in the same manner as Example 1. The individual results are shown in Tables 11 and 12.

TABLE 4

| Chemical Component | Concentration |
| --- | --- |
| Nickel chloride•hexahydrate | 180 g/L |
| Sodium chloride | 200 g/L |
| Boric acid | 40 g/L |
| Sodium saccharin | 5 g/L |

Example 5

A rare earth magnet was produced under the conditions equal to those of Example 1, except that a plating bath (pH:

4.0, temperature of 50° C.) having a composition of Table 5 below was used and a Ni-plated film was formed, in place of a Cu plated-film, over the surface of a magnet body as a coating layer. In addition, individual evaluations were performed on the rare earth magnet in the same manner as Example 1. The individual results are shown in Tables 11 and 12.

TABLE 5

| Chemical Component | Concentration |
| --- | --- |
| Nickel sulfate•hexahydrate | 200 g/L |
| Sodium chloride | 150 g/L |
| Boric acid | 40 g/L |
| 1,3,6-naphthalene trisulfonate sodium | 3 g/L |
| Coumarin | 0.05 g/L |

Example 6

A rare earth magnet 1, which has an underlying layer made of a Ni-plated film over the surface of the magnet body, was produced under the conditions equal to those of Example 3. The rare earth magnet 1 was washed by water and was immersed into a second plating bath (pH: 7.0, temperature: 50° C.) having a composition of Table 6, and galvanic start electroless plating was performed by a barrel plating method.

TABLE 6

| Chemical Component | Concentration |
| --- | --- |
| Nickel chloride•hexahydrate | 30 g/L |
| Dimethylamine borane | 10 g/L |
| Malonic acid | 10 g/L |
| Lead chloride | 0.01 g/L |

The galvanic start electroless plating was performed, in detail, as follows. A nickel plate, which was immersed into the second plating bath in advance, was used as a positive electrode of opposite electrodes. The positive electrode is connected to a plating barrel, into which the rare earth magnet 1 was loaded, via a DC power source. Afterwards, current from the DC power source was adjusted so that a current density became 0.2 A/dm$^2$, and an electroless plating reaction was started using a galvanic starter that applies a negative potential to the rare earth magnet 1 for five seconds. The application of potential from the DC power source was stopped, and the rare earth magnet 1 was immersed into the second plating bath until an electroless plated film was formed at a thickness of 8 μm over the surface of the rare earth magnet 1.

In this manner, a rare earth magnet 3, which has a coating layer formed of the electroless plated film over the surface of the rare earth magnet 1, was produced. The rare earth magnet 3 is structured such that the underlying layer and the coating layer are laminated sequentially from the side of the magnet body. In addition, individual evaluations were performed on the rare earth magnet 3 in the same manner as Example 1. The individual results are shown in Tables 11 and 12.

Example 7

A rare earth magnet, in which an underlying layer made of a Ni-plated film and a coating layer made of a CuSn alloy are laminated sequentially from a magnet body, was produced under the conditions equal to those of Example 3, except that a plating bath (pH: 9.0, temperature: 60° C.) having a composition of Table 7 below was used as a second plating bath. In addition, individual evaluations were performed on the rare earth magnet in the same manner as Example 1. The individual results are shown in Tables 11 and 12.

TABLE 7

| Chemical Component | Concentration |
| --- | --- |
| Copper pyrophosphate•trihydrate | 15 g/L |
| Potassium pyrophosphate | 200 g/L |
| Tin(II) chloride | 10 g/L |
| Potassium chloride | 100 g/L |
| Ammonium oxalate | 20 g/L |

Comparative Example 1

A rare earth magnet was produced under the conditions equal to those of Example 1, except that a plating bath (pH: 4.5, temperature: 50° C.) having a composition of Table 8 below was used and a Ni-plated film was formed, in place of a Cu-plated film, over the surface of a magnet body as a coating layer. In addition, individual evaluations were performed on the rare earth magnet in the same manner as Example 1. The individual results are shown in Tables 11 and 12.

TABLE 8

| Chemical Component | Concentration |
| --- | --- |
| Nickel sulfate•hexahydrate | 270 g/L |
| Nickel chloride•hexahydrate | 50 g/L |
| Boric acid | 45 g/L |
| 1,5-sodium disulfate | 8 g/L |
| 2-butyne-1,4-diol | 0.1 g/L |

Comparative Example 2

A rare earth magnet was produced under the conditions equal to those of Example 1, except that the first plating bath of Example 3 was used as a plating bath and a Ni-plated film was formed, in place of a Cu-plated film, over the surface of a magnet body as a coating layer. In addition, individual evaluations were performed on the rare earth magnet in the same manner as Example 1. The individual results are shown in Tables 11 and 12.

Comparative Example 3

A rare earth magnet, in which an underlying layer and a coating layer are laminated sequentially from the side of the magnet body, was produced under the conditions equal to those of Example 3, except that the second plating bath (pH: 4.0, temperature: 30° C.) shown in Table 9 was used as a plating bath. In addition, individual evaluations were performed on the rare earth magnet in the same manner as Example 1. The individual results are shown in Tables 11 and 12.

TABLE 9

| Chemical Component | Concentration |
| --- | --- |
| Gold potassium cyanide | 3 g/L |
| Cobalt sulfate•heptahydrate | 7 g/L |
| Citric acid | 90 g/L |
| Potassium citrate | 80 g/L |

Comparative Example 4

A rare earth magnet, in which an underlying layer and a coating layer are laminated sequentially from the side of the magnet body, was produced under the conditions equal to those of Example 3, except that a plating bath (pH: 9.0, temperature: 40° C.) having a composition of Table 10 below was used as the second plating bath. In addition, individual evaluations were performed on the rare earth magnet in the same manner as Example 1. The individual results are shown in Tables 11 and 12.

TABLE 10

| Chemical Component | Concentration |
| --- | --- |
| Stannic chloride•dihydrate | 35 g/L |
| Potassium pyrophosphate | 150 g/L |

Comparative Example 5

A magnet body was manufactured in the same manner as in Example 1 above and pretreatment as in Example 1 above was performed. Afterwards, a phenolic resin paint was applied over the surface of the magnet body by spray coating, followed by heating at 150° C. for 20 minutes. In this manner, a rare earth magnet was produced by forming a phenolic resin film having a thickness of 10 μm as a coating layer over the surface of the magnet body. In addition, individual evaluations were performed on the rare earth magnet in the same manner as Example 1. The individual results are shown in Tables 11 and 12.

TABLE 11

| | Coating layer | | Underlying layer | | Evaluation of hardness on the surface (coating layer) of rare earth magnet | | | |
| --- | --- | --- | --- | --- | --- | --- | --- | --- |
| | Type | Thickness [μm] | Type | Thickness [μm] | HM [N/mm$^2$] | $\eta_{IT}$ [%] | $E_{IT}$ [GPa] | Hv |
| Example 1 | Cu film | 10 | None | 0 | 2149 | 11.8 | 158 | 220 |
| Example 2 | Ni film | 10 | None | 0 | 2982 | 13.9 | 195 | 400 |
| Example 3 | Ni film | 8 | Ni coating | 2 | 2982 | 13.9 | 195 | 400 |
| Example 4 | Ni film | 10 | None | 0 | 3799 | 19.1 | 189 | 500 |
| Example 5 | Ni film | 10 | None | 0 | 4421 | 22.4 | 183 | 520 |
| Example 6 | Electroless NiB film | 8 | Ni coating | 2 | 5773 | 23.8 | 200 | 550 |
| Example 7 | CuSn alloy film | 8 | Ni coating | 2 | 6382 | 18.0 | 195 | 550 |
| Comp Ex 1 | Ni film | 10 | None | 0 | 5324 | 28.9 | 192 | 550 |
| Comp Ex 2 | Ni film | 10 | None | 0 | 3011 | 27.3 | 180 | 500 |
| Comp Ex 3 | Au film | 8 | Ni coating | 2 | 1259 | 19.9 | 87 | 220 |
| Comp Ex 4 | Sn film | 8 | Ni coating | 2 | 573 | 9.5 | 48 | 50 |
| Comp Ex 5 | Resin film | 10 | None | 0 | 537 | 35.7 | 26 | 80 |

TABLE 12

| | Sand-dust test (JIS C60068-2-68) | | | | | | | | | | | |
| --- | --- | --- | --- | --- | --- | --- | --- | --- | --- | --- | --- | --- |
| | dust fall: 1 day | | | dust fall: 3 days | | | dust fall: 10 days | | | dust fall: 30 days | | |
| | AA[1] | Ob[2] | CR[3] | AA[1] | Ob[2] | CR[3] | AA[1] | Ob[2] | CR[3] | AA[1] | Ob[2] | CR[3] |
| Example 1 | <1 μm | A | A | 1 μm | B | A | 3 μm | B | A | 5 μm | B | A |
| Example 2 | <1 μm | A | A | <1 μm | A | A | 1 μm | B | A | 3 μm | B | A |
| Example 3 | <1 μm | A | A | <1 μm | A | A | 1 μm | B | A | 3 μm | B | A |
| Example 4 | <1 μm | A | A | <1 μm | A | A | 1 μm | B | A | 2 μm | B | A |
| Example 5 | <1 μm | A | A | <1 μm | A | A | <1 μm | A | A | 1 μm | B | A |
| Example 6 | <1 μm | A | A | <1 μm | A | A | <1 μm | A | A | <1 μm | A | A |
| Example 7 | <1 μm | A | A | <1 μm | A | A | <1 μm | A | A | <1 μm | A | A |
| Comp Ex 1 | <1 μm | A | A | <1 μm | A | A | <1 μm | A | A | 1 μm | C | B |
| Comp Ex 2 | <1 μm | A | A | <1 μm | A | A | 2 μm | C | B | 5 μm | C | B |
| Comp Ex 3 | 2 μm | B | A | 4 μm | B | A | BE[4] | D | B | BE[4] | D | B |
| Comp Ex 4 | 3 μm | B | A | 7 μm | B | A | BE[4] | D | B | BE[4] | D | B |
| Comp Ex 5 | 5 μm | B | A | BE[4] | D | B | BE[4] | D | B | BE[4] | D | B |

Notes)
AA[1]: Amount of Abrasion,
Ob[2]: Observation,
CR[3]: Corrosion Resistance.
BE[4]: Body exposed. (Scrath reached to the magnet body or underlying layer.)

In Examples 1 to 7 above, the coating layers were worn at a small amount, and no cracks were formed on the coating layers. In addition, the results of Examples 2 and 3 showed that the rare earth magnet having the coating layer with a Martens hardness of a certain value or more and an elastic resilience of a certain value or less has excellent scratch resistance regardless of the presence of the underlying layer since it wears little and corrosion is sufficiently prevented.

What is claimed is:

1. A metal magnet comprising:
   a magnet body; and
   a coating layer over the magnet body, wherein the coating layer being a plated film has a Martens hardness of 2500-5000 N/mm$^2$ and an elastic resilience of 25% or less;
   wherein the coating layer is a Ni-plated film, a Ni—B-plated film, a Ni—P-plated film, a Cu-plated film, a Zn-plated film, a Cr-plated film, a Sn-plated film, an Ag-plated film, an Au-plated film, an Al-plated film, or a metal-plated layer comprising an alloy of Ni, Cu, Zn, Cr, Sn, Ag, Au, or Al.

2. The metal magnet according to claim 1, wherein the elastic resilience is 5% or more.

3. The metal magnet according to claim 2, wherein the coating layer has a thickness from 1 to 50 μm.

4. A motor comprising the metal magnet according to claim 2.

5. The metal magnet according to claim 1, wherein the coating layer has a thickness from 1 to 50 μm.

6. A motor comprising the metal magnet according to claim 5.

7. A motor comprising the metal magnet according to claim 1.

8. The metal magnet according to claim 1, comprising the coating layer as the outermost layer.

9. The metal magnet according to claim 1, wherein the coating layer is the plated film produced using a plating bath comprising at least one selected from the group consisting of potassium chloride and sodium chloride.

10. The metal magnet according to claim 9, wherein the total content of the potassium chloride and sodium chloride is 50 to 250 g/l.

11. The metal magnet according to claim 1, wherein the plated film is a Ni-plated film.

12. A method of applying a metal magnet to a motor, the method comprising:
    measuring a Martens hardness and an elastic resilience of the metal magnet comprising a magnet body and a coating layer being a plated film over the magnet body; and
    selecting the metal magnet having a Martens hardness of 2500-5000 N/mm$^2$ and an elastic resilience of 25% or less,
    wherein the coating layer is a Ni-plated film, a Ni—B-plated film, a Ni—P-plated film, a Cu-plated film, a Zn-plated film, a Cr-plated film, a Sn-plated film, an Ag-plated film, an Au-plated film, an Al-plated film, or a metal-plated layer comprising an alloy of Ni, Cu, Zn, Cr, Sn, Ag, Au, or Al.

13. The method of claim 12, wherein the plated film is a Ni-plated film.

* * * * *